Feb. 13, 1951 D. U. ROBINSON 2,541,834
ANTIGLARE OR DIMMING DEVICE
FOR MOTOR VEHICLE HEADLAMPS
Filed Sept. 23, 1948 3 Sheets-Sheet 1
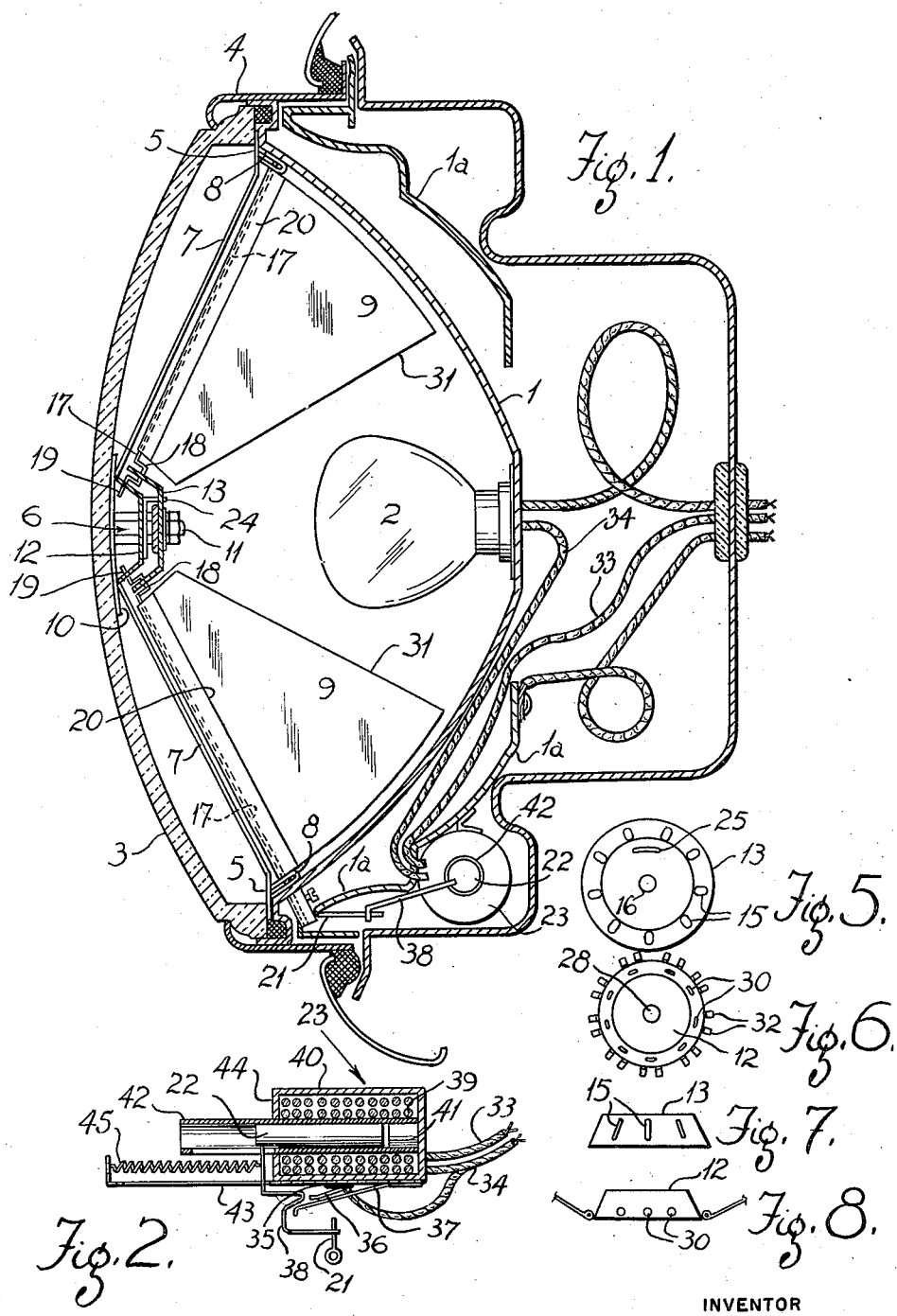
INVENTOR
DOROTHEA URSULA ROBINSON
ATTORNEYS Feb. 13, 1951 D. U. ROBINSON 2,541,834
ANTIGLARE OR DIMMING DEVICE
FOR MOTOR VEHICLE HEADLAMPS Filed Sept. 23, 1948 3 Sheets-Sheet 2

INVENTOR
DOROTHEA URSULA ROBINSON

Pennie, Edmonds, Morton & Barrows
ATTORNEYS

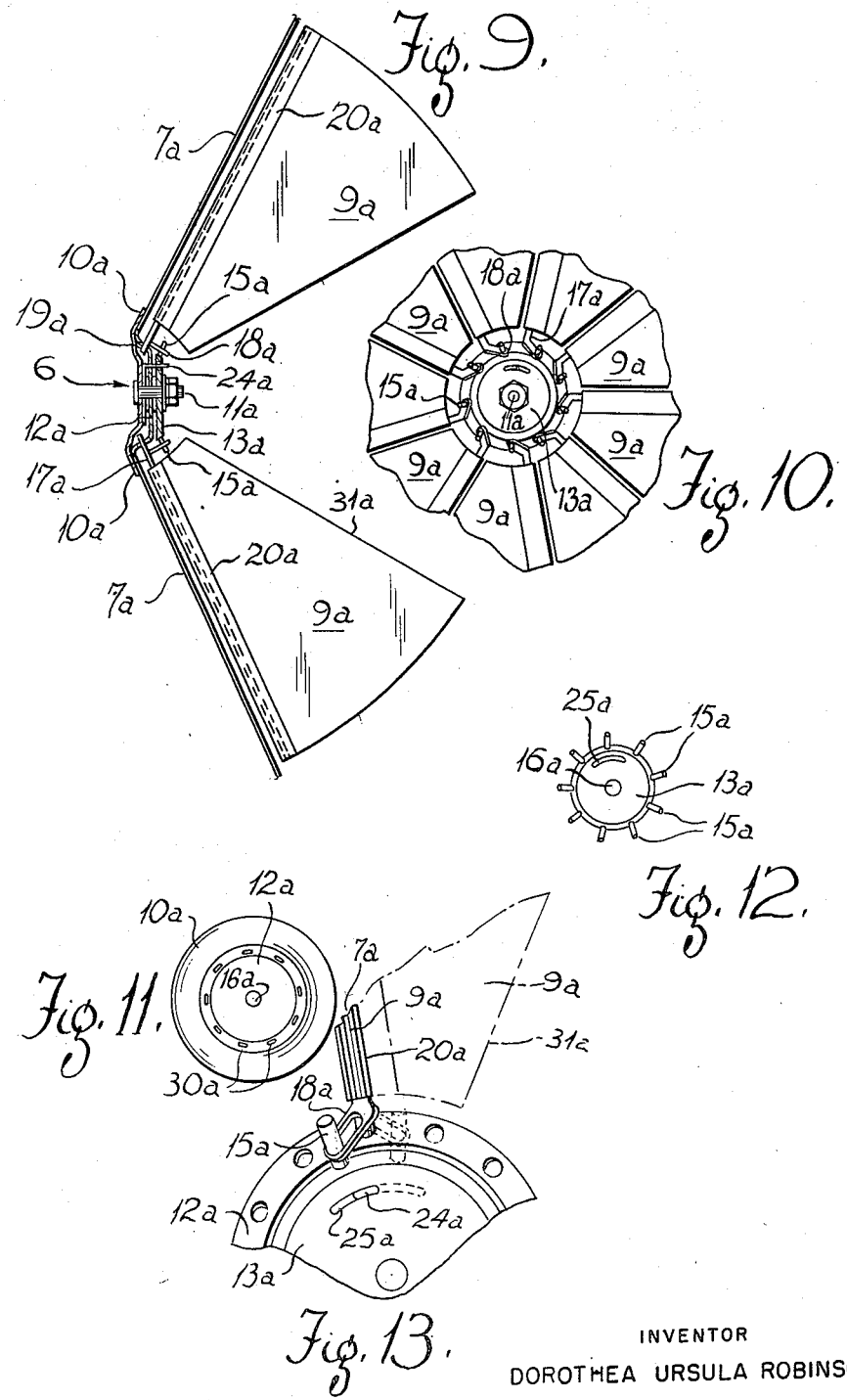

UNITED STATES PATENT OFFICE 2,541,834

ANTIGLARE OR DIMMING DEVICE FOR MOTOR VEHICLE HEAD LAMPS

Dorothea Ursula Robinson, Johannesburg, Transvaal, Union of South Africa

Application September 23, 1948, Serial No. 50,694
In Great Britain October 2, 1947

7 Claims. (Cl. 240—46.29)

This invention relates to an improved antiglare or dimming device for lamps, and is particularly, although not exclusively applicable to the head-lamps of motor and other road vehicles.

It is well-known that at night time the driver of a road vehicle when approaching an oncoming vehicle, tends to be temporarily blinded by the glare of the head-lamps of the approaching vehicle, unless some form of dimming device is used by the oncoming car. Many kinds of dimming devices have been made and used in the past, but not one has been an unqualified success, so that the problem has not yet been solved. The present invention is an attempt to solve this problem in a satisfactory manner, by providing a device which, while eliminating glare, will not reduce the strength of the light beams to an extent which would reduce visibility to a dangerous degree.

According to the invention, a device for the purpose set forth, consists of a plurality of radially-disposed light-diffusing dimming flaps of translucent sheet material, arranged for partial rotation about axes in front of the light-source of the lamp, and with control means causing simultaneous rotational or pivoting movement of said flaps about their axes, through an angle of substantially 90 degrees, so that they are capable of being rotated from positions in which their planes are substantially parallel with the light rays of the lamp, in which positions they cause the minimum of obstruction, to positions in which the flaps are substantially at right angles to said rays so as thereby to impart a diffusing or dimming effect on the light emitted by the lamp, due to the rays having to pass through said flaps.

The several radially-disposed flaps are arranged in ring formation for rotary movement about radial axes, which extend in each case along one radial edge of a flap. Said radial axes are formed by radially-disposed pivot rods or the equivalent, journaled at each end in suitable bearings, and each having a dimming flap rigidly attached thereto, along one radial edge. The control means associated with said pivot pins or the like, is arranged to cause simultaneous rotary or pivoting movement of all the dimming flaps, by movement of a single control member adapted to co-act with the inner or outer ends of all the pivot pins, or the like, which control means is preferably arranged, in the case of motor vehicles, to be operated from the driver's seat. Instead of pivot pins the flaps may be rotatably mounted by means of trunnion pins arranged one at each end thereof.

For use in a motor vehicle headlamp, the several parts of the device are assembled in a frame as a unit, so constructed that it is capable of being inserted and fixed within the usual lamp casing just behind the front glass lens of the lamp, without any structural alterations to the lamp structure. In this way, the device is capable of being made and sold as an accessory for easy fitting to existing motor vehicle lamps, although it may, of course, be embodied in new lamps during the manufacture thereof.

Since the casing of the usual motor vehicle headlamp is circular, the frame of the device is likewise made of circular form, so as to fit it. In this case the inner ends of the pivot pins or the like are journaled in a central bearing ring, while the outer ends thereof, are journaled in an outer bearing ring, which is of such a diameter as to fit within the normal sealing ring of the lamp. The dimming flaps located in the annular space between the two bearing rings are of truncated sector-shape and are in the form of frames, each provided with or consisting of a thin sheet of suitable translucent material, adapted to act as a light-diffusing screen.

According to one form of construction, simultaneous rotary or pivoting movement of the dimming flaps is effected in a simple manner by providing each of the inner ends of the pivot or trunnion pins, with a short crank arm and arranging for all the crank arms to project through apertures in a central rotatably mounted, circular control plate, so that rotary movement applied to any one of the dimming flaps is simultaneously imparted to all the others. Control is effected by arranging for the outer end of one pivot or trunnion pin to project through the reflector at which point it is connected by means of a crank arm and link mechanism, or by other suitable means (preferably being within the lamp casing) to a control knob, handle or the like, located within easy access of the driver of the vehicle, such as in the floorboards or on the instrument panel. The control means may be by Bowden cable, solenoid or fluid pressure, or any other suitable power-transmitting device of the remote control kind.

The frame in which the several moving parts of the device are mounted, is arranged to be fitted between the reflector and the lamp glass, which is held in position in known manner by spring pressure.

In a preferred construction of the device, suitable for fitting to lamps in which the lamp glass is of convex form, the frame is of shallow, substantially frusto-conical form, so arranged that as the dimming flaps are turned into their open positions, they will swing back and inwards without fouling either the reflector or the actual lamp globe.

The device is designed to conform closely with the shape of the space between the reflector and the lamp glass of the present type of lamp used on the majority of cars and to be contained within the unit without upsetting the sealing between the front and other parts of the headlamp.

It is to be understood that the several dimming flaps are so constructed and arranged as when they are in their closed positions, to cause dimming of the lights, their edges fitting snugly against the rim of the frame and with one another, so that no light-rays will be emitted by the lamp except those which pass through the translucent screens of the several dimming flaps.

An important feature is that the diffusion of the light rays takes place at the critical position that is at a suitable distance from the light source to give complete diffusion and after the light rays have been reflected, as diffusion before reflection does not efficiently eliminate glare owing to the inherent or designed action of parabolic reflectors. The frusto-conical design of the device with the diffusing element forwardly projecting permits the diffused light to spread sideways as well as forward. When full intensity of headlights is required on dark open roads it is readily available, yet when the intensity of the normal headlights is likely to endanger or inconvenience oncoming traffic or pedestrians, it can be instantaneously diffused to completely eliminate glare, irrespective of the angle from which the headlight is viewed, whilst still giving ample and efficient light for safe driving even should any oncoming vehicle fail to reduce the intensity of its headlights.

The device does not rely upon the provision for downwardly directing the beam, as arranged on the average modern headlight at present in use, but efficiently diffuses the light rays when directed ahead with full intensity. This will enable future reflectors to be designed for the sole purpose of projecting the beam at that point of the road which is considered most advantageous for safe high speed driving; and in fact the intensity of future headlights may be increased to hitherto unprecedented limits. In this way reflectors will no longer need to be designed to provide for a downward directed beam to lessen the glare as at present.

In order that the invention may be more clearly understood and carried into practice, reference is now made to the accompanying drawings in which like reference numerals refer to like parts throughout the several views.

In the drawings:

Figure 1 is a vertical longitudinal cross-section of a dimming device constructed according to the present invention, shown fixed in a standard motor car headlamp and with the dimming flaps in the inoperative position, that is, parallel to the reflected light rays;

Figure 2 depicts a solenoid actuating mechanism for the flaps;

Figures 5 and 6 are rear elevations respectively of the outer and movable bearing plate of the central bearing assembly and the fixed bearing plate;

Figures 7 and 8 are side elevations of the movable and fixed bearing plates shown respectively in Figs. 5 and 6;

Figure 9 is an incomplete vertical longitudinal cross-section of an alternative method of operating the dimming flaps;

Figure 10 is a fragmental rear view of the alternative central bearing assembly shown in Figure 9;

Figures 11 and 12 are respectively rear views of the alternative bearing assembly outer and movable and fixed bearing plates;

Figure 13 is a fragmental view, drawn to an enlarged scale, of the alternative central movable bearing plate in inoperative and operative positions.

Figure 3:
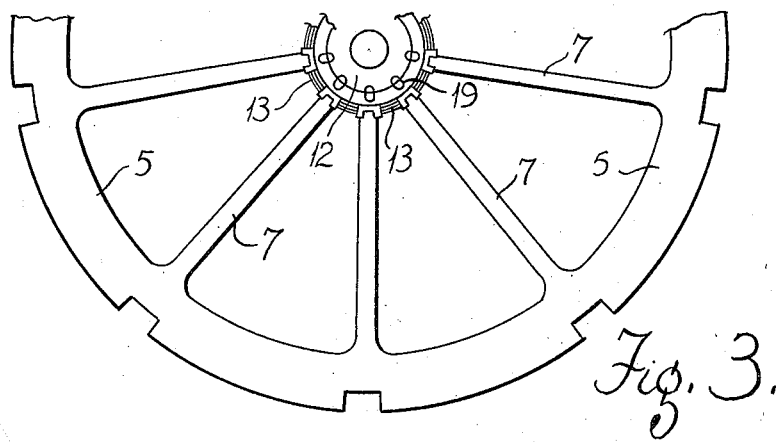
Figure 3 is an incomplete front elevation of the flaps frame assembly.
Figure 4:
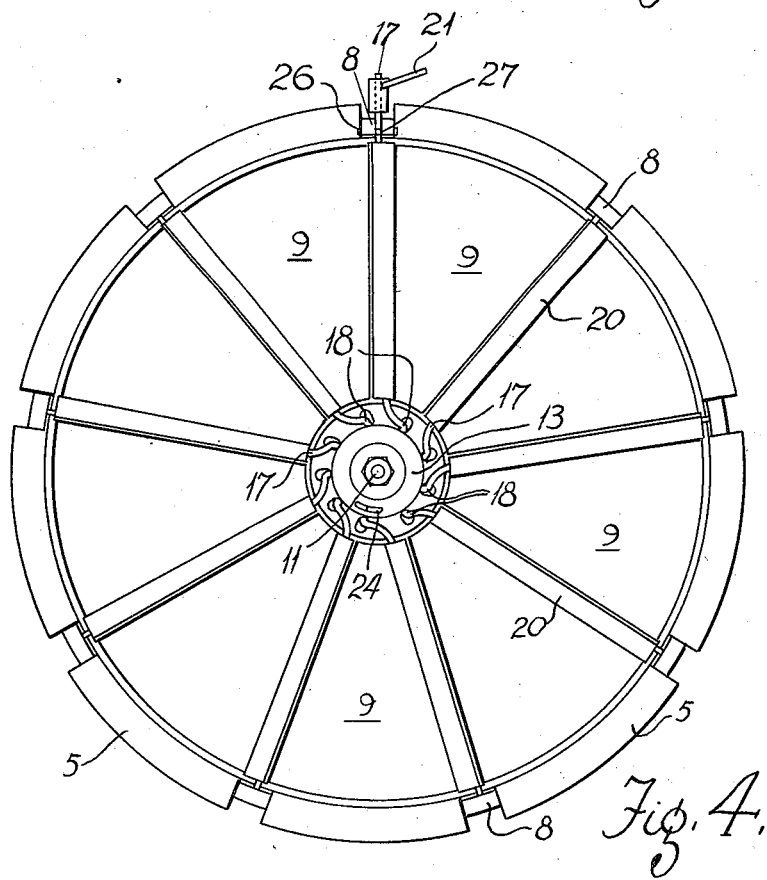
Figure 4 is a rear elevation of the dimming device assembly only, with the dimming flaps in the operative position, that is, substantially normal to the light rays.

Referring to Figures 1 to 8 of the drawings, reference numeral 1 denotes the headlamp reflector to which is fixed the lamp proper 2. The headlamp glass 3 and the reflector 1 are adapted to be secured by their flange-like rims in the usual headlamp rim 4' in the known manner in conjunction with the usual spring clips (not shown).

The dimming device consists of an annular member 5 and a central bearing assembly indicated generally by reference 6, which is carried by at least three radial supports 7 fixed by their outer ends to the annular member 5 and by their inner ends to the central assembly 6. Said central assembly is adapted to be located forwardly of the plane of the annular member 5 so that the dimming device will be of substantially frusto-conical shape. The annular member 5 is provided with a plurality of equally spaced obliquely disposed and rearwardly extending bearing elements 8 preferably shaped from radial lugs provided on the annular member 5, bent to their desired angular inclination from the plane of the annular member 5 and back on themselves into a double thickness. Holes drilled through the doubled lug form the bearing 8 for the outer ends of the shafts 17.

The central bearing assembly 6 preferably consists of a face plate 10 which is part of and attached to a rearwardly extending center pin 11 to which a fixed bearing plate 12 is secured and about which an inner movable bearing plate 13 is mounted for partial rotation. The movable bearing plate 13 is an inverted frusto-conical cup, the sides of which have a plurality of equidistant slots 15 and the outer surface of which is parallel to the inclined bearing elements 8 of the annular member 5. The plate 13 is rotatably mounted by its centre hole 16 on the rear end of the centre pin 11 and is adapted substantially to enclose the bearing plate 12 which is fixed by its centre hole 28 engaging centre pin 11 forwardly of the bearing plate 13 and secured to the central bearing assembly by a nut which also secures the rearwardly projecting extension 24 in a fixed position. The fixed bearing plate 12 is also an inverted frusto-conical cup, the sides of which have a plurality of equidistant radial holes 30 equal to the number of slots 15 in the movable bearing plate 13 and the outer surface of which is parallel to the outer surface of the movable bearing plate 13 and bearing elements 8 of the annular member 5 in the assembled state of the device. The number of holes in fixed bearing plate 12 and slots in movable bearing plate 13 and also the number of bearing elements 8 is equal to the number of dimming flaps 9.

In the preferred construction of the device, as shown in the drawings, the number of dimming flaps is nine, but this number may be varied to suit the particular headlamp to which the device is to be fitted.

Each dimming flap 9 is of substantially truncated sector shape and is secured along one radial side to a light shaft 17 located at its outer end in one of the bearing elements 8. The inner end of each shaft 17 is provided with a cranked portion 18 which is located inwardly of the extreme tip 19 of the said inner end. The shaft 17 and dimming flap 9 are preferably rigidly secured together by a U-shaped metallic strip 20 forming a marginal edge on the said radial side of the flap 9. The cranked portion 18 of each shaft 17, which is arranged substantially parallel to the secured marginal edge of the flap 9 is adapted to engage a slot 15 in the conical side of the movable bearing plate 13 while the tip 19 of each shaft 17 engages hole 30 in the conical side of the fixed bearing plate 12. The cranks 18 are adapted to cause rotation of their shafts 17 and flaps 9 when the movable bearing plate 13 is rotated.

One of the shafts 17 extends through a small hole in the reflector edge, the extension being provided with a cranked portion 21 attached by a suitable collar and extending through an existing window in the reflector housing 1a where it is linked to the armature 22 of the solenoid 23 by a connecting arm 38.

The solenoid 23 when energised is adapted to retract its armature 22 which in turn causes rotation of the connected shaft 17 which is transmitted to the movable bearing plate 13 through the crank 18 of the said shaft working in one of the slots 15. The bearing plate 13 in turn transmits its motion to the other shafts 17 through their cranks 18 working in the other slots 15. The rotation of the bearing plate 13 is limited to the required amount of movement by means of a rearwardly projecting extension or pin 24 on the rearwardly directed surface of the fixed bearing plate 12 which engages a short arcuate slot 25 provided in the moving bearing plate 13. The length of the slot 25 is just sufficient to permit rotation of bearing plate 13 to such extent that the flaps 9 may be turned through an angle of substantially 90°.

The folded radial lug forming the bearing element 8 of that shaft 17 (i. e. the master shaft) to which is attached the crank 21, is provided with a radial slot which, on folding of the lug, forms a notch 27 for admission of said shaft 17 where it is located and retained by a pin 26 inserted in the fold of the said lug. The outer end of each of the other shafts 17 is located in one of the bearing elements 8 by passing through the hole in the inner edge of the folded lug and bearing against the outer edge of the said folded lug.

The face plate 10, in addition to securing the centre pin 11 in the centre bearing assembly, is provided to enhance the appearance of the device.

The supporting bars or struts 7 are preferably fixed to the fixed bearing plate 12 by eyes 32 formed by pairs of parallel extensions provided at three or more points of the fixed bearing plate 12, the number of points depending on the number of bars or struts used. They may however be attached to the fixed bearing plate by means other than that mentioned, such as welding, soldering, riveting or bolting.

The particular method indicated of actuating the mechanism of the device by means of a solenoid, for which several other power-transmitting devices may be substituted, may comprise a soft iron casing 40 (Fig. 2), end cover 44, core 41 windings 39 and armature 22. The central guide tube is extended as indicated by 42 and has a slot to guide the projecting arm 38 which engages with crank 21. The armature 22 when solenoid is not energized, is held in its outermost position by spring 45 attached to extension 43, which latter also has a slot to act as guide for arm 38. Winding 39 is made of heavy gauge low resistance wire, one end 33 connected to the lead from battery for dim supply via normal "dim-bright" switch, the other end 34 running to "dim" contact for lamp, but also shorted to earth via contacts 37 and 36, the latter being insulated from earth by insulation 35. With lights on bright, flaps 9 are parallel to light rays, held in position by spring 25. When lights are required to be diffused and dimming flaps 9 therefore brought into the operative position, the dim switch on the floorboard is depressed in the normal manner, supply momentarily runs to earth via contacts 36 and 37, violently energizing windings 39 and causing armature 22 to strike core 41. Just prior to armature 22 striking core 41, arm 35 engages contact 37 which, by virtue of its inclined construction, causes a gap between itself and contact 36 so that the armature 22 is held in close contact with core 41 by the normal dim current passing through windings 39.

This action causes cranked portion 21 to rotate, thus placing the dimming flaps 9 in operative position at substantially 90° to the light rays, the free radial edges 31 engaging the fixed marginal edges of adjacent flaps in overlapping or adjoining relationship and forming an outwardly projecting frusto-conical cover of diffusing material to the reflector thus diffusing the light rays and eliminating effectively the glare of the headlight.

In the alternative construction shown in Figs. 9 to 13, the central bearing assembly consists of a face plate 10a which is part of fixed bearing plate 12a and to which are attached the several supporting bars or struts 7a at their inner ends. The fixed bearing plate 12a is of frusto-conical construction having a number of equidistant radial holes which form bearings for the inner ends of shafts 17a. The movable bearing plate 13a, also frusto-conical in construction, rotates in the same way as the movable bearing plate 13 in Figure 1. Instead of slots 15, pins 15a project parallel to the shafts 17a and instead of cranks 18, the shafts 17a are provided with slotted extension arms 18a rigidly secured at right angles to shafts 17a and respectively receiving the pins 15a.

When the control shaft 17a is rotated as by the described means of a cranked portion attached to the outer end extending through the reflector, the movement is transmitted through the slotted extension arm 18a and the pin 15a causing rotation of the movable bearing plate 13a thus rotating in turn the other slotted extension arms 18a and so causing the dimming flaps 9a to move from inoperative position parallel to the light rays to the operative position.

The preferred material for the dimming flaps is frosted mica, made according to the process described in the specification of Union of South Africa Patent No. 22/25; but the invention is not

What I claim is:

1. An anti-glare or dimming device for the headlamps of motor vehicles and the like, in which the headlamp includes a glass or lens in front of a reflector and a globe, which comprises a plurality of radially disposed light-diffusing flaps of suitable translucent material, each flap being of truncated sector shape and each being mounted for pivotal movement about one radially disposed edge, an outer bearing ring, a central bearing member in front of the plane of the ring, a pivoting member for each flap, the outer ends of the pivot members providing the pivot axes for the flaps being journalled in the outer bearing ring and the inner ends thereof being journalled in the central bearing member, and control means co-acting with said pivot axis members and arranged to cause simultaneous rotation in the same direction of all the flaps from a fully closed or light-dimming position, in which the flaps constitute a forwardly projecting frusto-conical screen capable of being located in the space between the lamp reflector and the front glass of the lamp, to an open position in which the flaps lie with their planes substantially parallel with the projected light rays from the reflector and vice versa.

2. An anti-glare or dimming device as claimed in claim 1, wherein the flaps are designed both as regards number and dimensions so that in their closed positions each flap fills the gap between it and an adjacent flap, and in their open position the flaps clear both the reflector and the lamp globe.

3. An anti-glare or dimming device as claimed in claim 1, wherein the pivot axis members are in the form of shafts to which the flaps are fixed along one radial edge, wherein the shafts adjacent their inner pivotally supported ends are each provided with an arm, and a central rotatably mounted control plate with which said arms co-act, whereby partial rotation of any one shaft constituting a control member causes simultaneous and equal rotary movement of all the flaps.

4. An anti-flare or dimming device as claimed in claim 1, wherein the pivot axis members are in the form of shafts to which the flaps are fixed along one radial edge, wherein the shafts adjacent their inner pivotally mounted ends are each provided with a cranked portion, and a central frusto-conical shaped control plate rotatably mounted on said central bearing member having spaced slots in its side wall in which said cranked portions respectively engage, whereby partial rotation of any one shaft causes simultaneous and equal rotary movement of all the flaps.

5. An anti-flare or dimming device as claimed in claim 1, wherein the pivot axis members are in the form of shafts to which the flaps are respectively fixed along one radial edge, wherein the shafts adjacent their inner pivotally mounted ends are each provided with a slotted arm, and a central frusto-conical shaped control plate rotatably mounted on said central bearing member having spaced pins projecting from its peripheral face which are respectively engaged with said slotted arms, whereby partial rotation of any one shaft causes simultaneous and equal rotary movement of all the flaps.

6. An anti-glare or dimming device as claimed in claim 1, which is constructed as a unit and in which the outer bearing ring is provided with a peripheral flange which is designed to be positioned between the edges of the reflector and the front glass of the lamp, whereby the device is capable of being fitted to existing motor vehicle headlamps without the necessity for any serious structural alterations.

7. An anti-glare or dimming device as claimed in claim 1, wherein the pivot axis members are in the form of shafts to which the flaps are fixed along one radial edge, wherein the shaft adjacent their inner pivotally mounted ends are each provided with an arm, a central rotatably mounted control plate with which said arms co-act, whereby partial rotation of any one shaft constituting a control member cause simultaneous and equal rotary movement of all the flaps, wherein said shaft constituting the control member is extended as regards its outer end and is adapted to project through an aperture in the lamp casing, and wherein control mechanism is provided capable of being actuated from the driver's seat of the vehicle and is operatively connected to said outwardly projecting end of said shaft.

D. U. ROBINSON.

REFERENCES CITED

The following references are of record in the file of this patent:

UNITED STATES PATENTS

| Number | Name | Date |
|---|---|---|
| 1,164,282 | Hennings | Dec. 14, 1915 |
| 1,525,541 | Hall | Feb. 10, 1925 |
| 2,170,552 | De Porter | Aug. 22, 1939 |

FOREIGN PATENTS

| Number | Country | Date |
|---|---|---|
| 272,507 | Great Britain | Feb. 9, 1928 |